US009668122B2

(12) United States Patent
Petersson et al.

(10) Patent No.: US 9,668,122 B2
(45) Date of Patent: May 30, 2017

(54) MANAGING NETWORK CONNECTIVITY OF A DEVICE COMPRISING AN EMBEDDED UICC

(71) Applicant: Telefonaktiebolaget L M Ericsson (publ), Stockholm (SE)

(72) Inventors: Justus Petersson, Hässelby (SE); Niclas Anglert, Torhamn (SE); Stefan Schmidt, Ronneby (SE); Qiang Li, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/787,894

(22) PCT Filed: Sep. 29, 2015

(86) PCT No.: PCT/EP2015/072411
§ 371 (c)(1),
(2) Date: Oct. 29, 2015

(87) PCT Pub. No.: WO2016/091414
PCT Pub. Date: Jun. 16, 2016

(65) Prior Publication Data

US 2016/0373920 A1 Dec. 22, 2016

Related U.S. Application Data

(60) Provisional application No. 62/089,986, filed on Dec. 10, 2014.

(51) Int. Cl.
*H04W 8/18* (2009.01)
*H04L 29/06* (2006.01)
(Continued)

(52) U.S. Cl.
CPC ............ *H04W 8/183* (2013.01); *G06F 21/34* (2013.01); *H04L 61/2007* (2013.01);
(Continued)

(58) Field of Classification Search
CPC ..... H04W 8/813; H04W 4/001; H04W 4/005; H04W 8/20; H04L 61/2007
(Continued)

(56) References Cited

U.S. PATENT DOCUMENTS 8,098,779 B2 * 1/2012 Komninakis ............ H04B 1/10 329/320
9,369,863 B2 * 6/2016 Li ......................... H04W 8/183
(Continued)

FOREIGN PATENT DOCUMENTS

WO WO 2014/059913 A1 4/2014

OTHER PUBLICATIONS

International Search Report and Written Opinion Corresponding to International Application No. PCT/EP2015/072411; Date of Mailing: Dec. 4, 2015; 12 Pages.
(Continued)

*Primary Examiner* — Hai V Nguyen
(74) *Attorney, Agent, or Firm* — Sage Patent Group

(57) ABSTRACT

The invention relates to a node for managing network connectivity of a device comprising an embedded Universal Integrated Circuit Card (eUICC). The node is configured to provision the eUICC for network connectivity of the device. The method comprises acquiring an identity of at least one Subscription Manager-Data Preparation (SM-DP) entity, acquiring an identity of at least one Subscription Manager-Secure Router (SM-SR) entity, creating an association between the identity of the at least one SM-DP entity, the identity of the at least one SM-SR entity and an identity of the eUICC, and storing the created association, wherein the
(Continued)

stored association subsequently can be changed for the eUICC by changing at least one of the identity of the at least one SM-DP entity and the identity of the at least one SM-SR entity with which the eUICC is to be associated.

22 Claims, 4 Drawing Sheets

(51) Int. Cl.

| | |
|---|---|
| ***H04W 4/00*** | (2009.01) |
| ***H04W 12/06*** | (2009.01) |
| ***G06F 21/34*** | (2013.01) |
| ***H04L 29/12*** | (2006.01) |
| *H04W 8/20* | (2009.01) |

(52) U.S. Cl.
CPC ...... *H04L 63/0428* (2013.01); *H04L 63/0853* (2013.01); *H04W 4/001* (2013.01); *H04W 12/06* (2013.01); *H04W 4/005* (2013.01); *H04W 8/20* (2013.01)

(58) Field of Classification Search
USPC .......................................................... 455/558
See application file for complete search history.

(56) References Cited

U.S. PATENT DOCUMENTS 9,426,654 B2 * 8/2016 Lee ........................ H04W 12/06
9,451,459 B2 * 9/2016 Lee ........................ H04W 12/06
2009/0086864 A1 * 4/2009 Komninakis ............ H04B 1/10 375/346
2014/0237101 A1 * 8/2014 Park ...................... H04L 67/303 709/223
2014/0287725 A1 * 9/2014 Lee ....................... H04W 12/06 455/411
2014/0329502 A1 * 11/2014 Lee ....................... H04W 12/06 455/411
2015/0334552 A1 * 11/2015 Li ......................... H04W 8/183 370/329
2016/0286379 A1 * 9/2016 Li ......................... H04W 8/183
2016/0286380 A1 * 9/2016 Long ..................... H04W 12/04

OTHER PUBLICATIONS

V1 et al. "GSM Association Non-confidential Official Document 12FAST.13—Embedded SIM Remote Provisioning Architecture Embedded SIM Remote Provisioning Architecture Security Classification: Non-confidential Remote Provisioning Architecture for Embedded UICC GSM Association", Dec. 17, 2013, Retrieved from the internet at URL: http://www.gsma.com/connectedliving/wp-content/uploads/2014/01/1.-GSMA-Embedded-SIM-Remote-Provisioning-Architecture-Version-1.1.pdf.

ETSI, Technical Report—"Human Factors (HF); European accessibility requirements for public procurement of products and services in the ICT dȯmain (European Commission Mandate M 376, Phase 1)", ETSI TR 102 612 V1.1.1 (Mar. 2009), 219 pp.

GSM Association, "Embedded SIM Remote Provisioning Architecture, Version 1.1", Dec. 17, 2013, 84 pp.

GSM Association, "Remote Provisioning Architecture for Embedded UICC, Technical Specification, Version 1.0", Dec. 17, 2013, 294 pp.

* cited by examiner

MANAGING NETWORK CONNECTIVITY OF A DEVICE COMPRISING AN EMBEDDED UICC

CROSS REFERENCE TO RELATED APPLICATIONS

This application is a 35 U.S.C. §371 national stage application of PCT International Application No. PCT/EP2015/072411, filed on Sep. 29, 2015, which itself claims priority to U.S. provisional Application No. 62/089,986, filed Dec. 10, 2014, the disclosure and content of both of which are incorporated by reference herein in their entirety.

TECHNICAL FIELD

The invention relates to a node, and a method performed by the node, of managing network connectivity of a device comprising an embedded Universal Integrated Circuit Card (UICC). The invention further relates to a computer program for causing the node to perform the method according to the invention, and a corresponding computer program product.

BACKGROUND

Historically, every cellular device, such as a mobile phone, smartphone, or any other mobile terminal which is configured for communicating over a cellular radio access network, such as Global System for Mobile Communications (GSM), Universal Mobile Telecommunications System (UMTS), or Long-Term Evolution (LTE), has been equipped with a removable Universal Integrated Circuit Card (UICC). The UICC is a smart card defined in ETSI TR 102 216. It typically contains a number of applications, in particular the Subscriber Identity Module (SIM) application for use in GSM networks and the Universal SIM (USIM) for use in UMTS and LTE networks. The SIM and USIM store the International Mobile Subscriber Identity (IMSI) and one or more keys, or shared secrets, for deriving keys used for identifying and authenticating subscribers on mobile networks and for services provided by these networks.

Recently, the GSM Association (GSMA) has published specifications for a non-removable UICC, referred to as the embedded UICC or plainly eUICC. The eUICC contains an eSIM application, and the terms non-removable SIM, embedded SIM, and eSIM, are often used synonymously. The eUICC and its embedded SIM have the same functionality as the traditional UICC with its SIM and USIM, but the eUICC has a different form factor and is typically designed to be permanently soldered into a mobile terminal, rather than being removable. The eUICC is a smart card, similar to the UICC, i.e., an electronic device comprising embedded electronic circuits, such as a processor and memory.

Examples of usage areas for which eUICCs play a critical role ranges from traditional Machine-to-Machine (M2M) services, such as utility and automotive services, to usage in connected consumer electronics.

Important use-cases for the above areas include, e.g., when a mobile terminal comprising a eUICC gets provisioned for the first time with its first commercial operator, i.e., a Mobile Network Operator (MNO). This process is commonly denoted as "bootstrapping" or "provisioning of first operational profile". Other use-cases are, e.g., a "change of operator profile", i.e., when operator credentials on an eUICC are changed from a current commercial operator to a new commercial operator. As a further example, use-cases may also include "subscription transfer", i.e., when the Operator credentials residing on a current eUICC are transferred to a new eUICC.

In order to carry out the above use-cases Over The Air (OTA), i.e., without physically accessing the mobile terminal, in contrast to today's manually procedure which involves physically swapping the UICC, the GSMA has specified the roles of the Subscription Manager-Data Preparation (SM-DP) entity and the Subscription Manager-Secure Router (SM-SR) entity, for instance in GSMA Embedded SIM Remote Provisioning Architecture, Version 1.1, 17 Dec. 2013, and GSMA Remote Provisioning Architecture for Embedded UICC, Technical Specification, Version 1.0, 17 Dec. 2013.

The remote subscription management eco-system is characterized by a number of different SM-SR and SM-DP actors, and many times the SM-SR and SM-DP services are offered by same juridical person or entity. Nevertheless, the rationale of having the two different roles is, among Others, to invite new actors into the eco-system. For instance, SM-DP services may be offered by eUICC manufacturers also referred to as the Embedded UICC Manufacturers (EUM). Further, SM-SR services may, e.g., be offered by established Original Equipment Manufacturers (OEM).

Manufacturers of devices which are configured for communicating over cellular mobile networks need to have a business relation, directly or indirectly, with one or many EUMs as well as SM-DP actors, which many times are the same juridical person, though not always.

Discussions are ongoing to agree upon a common profile format/package that makes it possible for any SM-DP actor which complies with GSMA certification and accreditation specifications to download an operator profile onto an eUICC card which also complies with GSMA certification and accreditation specifications.

However, it may still be desirable for an MNO to be able to integrate several different SM-DP actors, for example, for specific vendor proprietary extensions, and for keeping existing business relationships and processes intact.

Today's standards do not give any guidance as to how to connect a specific eUICC, having a unique eUICC-ID, or EID, to more than one SM-DP.

SUMMARY

An object of the present invention is to solve, or at least mitigate, this problem in the art and to provide an improved method of managing network connectivity of a device comprising an eUICC.

This object is attained in a first aspect of the invention by a method performed by a node for managing connectivity of a device comprising an embedded Universal Integrated Circuit Card (eUICC). The node is configured to provision the eUICC for network connectivity of the device. The method comprises acquiring an identity of at least one Subscription Manager-Data Preparation (SM-DP) entity, acquiring an identity of at least one Subscription Manager-Secure Router (SM-SR) entity, creating an association between the identity of the at least one SM-DP entity, the identity of the at least one SM-SR entity, and an identity of the eUICC, and storing the created association. The stored association subsequently can be changed for the eUICC by changing at least one of the identity of the at least one SM-DP entity and the identity of the at least one SM-SR entity with which the eUICC is to be associated.

This object is attained in a second aspect of the invention by a node configured to manage connectivity of a device comprising an eUICC, the node being configured to provision the eUICC for managing the network connectivity of the device, which node comprises a processing unit and a memory, said memory containing instructions executable by said processing unit, whereby said node is operative to acquire an identity of at least one SM-SR entity, acquire an identity of at least one SM-DP entity, create an association between the identity of the at least one SM-DP entity, the identity of the at least one SM-SR entity, and an identity of the eUICC, and store the created association. The stored association subsequently can be changed for the eUICC by changing at least one of the identity of the at least one SM-DP entity and the identity of the at least one SM-SR entity with which the eUICC is to be associated.

Advantageously, rather than statically associating eUICCs with an SM-DP and an SM-SR, e.g., a service provided by the EUM, it is proposed to include, when ordering an eUICC or a subscription profile, identities and/or routable addresses of initial SM-SR and SM-DP nodes for the specific eUICC-ID of the ordered eUICC. The initial SM-SR and SM-DP nodes may be changed later on. Hence, by creating an association between the SM-DP identity (smdp-ID), the SM-SR identity (smsr-ID), and the eUICC-ID, a triplet of data is created where the smdp-ID and the smsr-ID subsequently can be changed for addressing new SM-DP and/or SM-SR entities for a particular eUICC-ID, thereby facilitating a flexible method of managing network connectivity for the device in which the eUICC is implemented.

In practice, in nodes which interwork with SM-DP and SM-SR entities, a table is created and maintained which holds the association between the three above mentioned identities, which preferably (but not necessarily) are routable. That is, the table contains triplets {smdp-ID, smsr-ID, eUICC-ID}. Such a table may hold associations for a great number of eUICCs. The nodes which interwork with SM-DP and SM-SR entities may, e.g., be nodes providing connectivity management to mobile terminals, including subscription management and OSS/BSS services. Based on the associations between eUICC-ID and the SM-DP/SM-SR identities, such nodes can in embodiments of the invention route to different SM-DPs, over the $S_2$ interface, and/or to different SM-SR, over the $S_4$ interface, as is illustrated below. The device connectivity management node may be operated by an MNO or by a third party offering device connectivity management services, e.g., services related to remote subscription management.

Thus, in an embodiment of the invention, when creating the association, the identities of a plurality of SM-DP entities are associated with the identity of the at least one SM-SR identity and the identity of the eUICC. This advantageously results in an association having the structure {smdp-ID1, smdp-ID2, . . . , smdp-IDn, smsr-ID, eUICC-ID}, where n denotes the number of different SM-DP entities with which the eUICC is associated.

Analogously, in a further embodiment of the invention, when creating the association, the identities of a plurality of SM-SR entities are associated with the identity of the at least one SM-DP identity and the identity of the eUICC. This advantageously results in an association having the structure {smdp-ID, smsr-ID1, smsr-ID2, . . . , smsr-IDm, eUICC-ID}, where m denotes the number of different SM-SR entities with which the eUICC is associated.

A combination of these two embodiments is envisaged, where the association will have the structure {smdp-ID1, smdp-ID2, . . . , smdp-IDn, smsr-ID1, smsr-ID2, . . . , smsr-IDm, eUICC-ID}, Advantageously, with this embodiment, a great measure of flexibility is provided regarding the capability of connecting the device, in which the eUICC is implemented, to a network.

In yet a further embodiment, since an eUICC may be provided with multiple subscription profiles, when creating the association, the identities of a plurality of SM-DP entities are associated with the identity of a single SM-SR entity and the identity of the eUICC, where the identity of each of the plurality of SM-DP entities is associated with a corresponding subscription profile among the plurality of subscription profiles. Hence, each eUICC is associated with a single SM-SR, and each subscription profile loaded into the eUICC is associated with a corresponding SM-DP.

In yet a further embodiment, the acquiring of an identity of at least one SM-SR entity comprises requesting the identity of the at least one SM-SR entity, wherein the at least one SM-SR identity is provided in an eUICC data file. The request may be made to an EUM of the eUICC or an SM-SR entity for which the identity is requested.

In yet another embodiment, the acquiring of an identity of at least one SM-DP entity comprises requesting the identity of the at least one SM-DP entity, wherein the at least one SM-DP entity is provided in a subscription profile data file. The request may be made to an SM-DP entity for which the identity is requested.

According to a third aspect of the invention, a computer program is provided. The computer program comprises computer-executable instructions for causing a node to perform steps according to an embodiment of the first aspect of the invention, when the computer-executable instructions are executed on a processing unit comprised in the node.

According to a fourth aspect of the invention, a computer program product is provided. The computer program product comprises a computer readable medium, the computer readable medium having the computer program according the third aspect of the invention embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The disclosure will now be described more fully hereinafter with reference to the accompanying drawings, in which certain embodiments are shown. This disclosure may, however, be embodied in many different forms and should not be construed as limited to the embodiments set forth herein; rather, these embodiments are provided by way of example so that this disclosure will be thorough and complete, and will fully convey the scope to those skilled in the art. Like numbers refer to like elements throughout the description.

Figure 1:
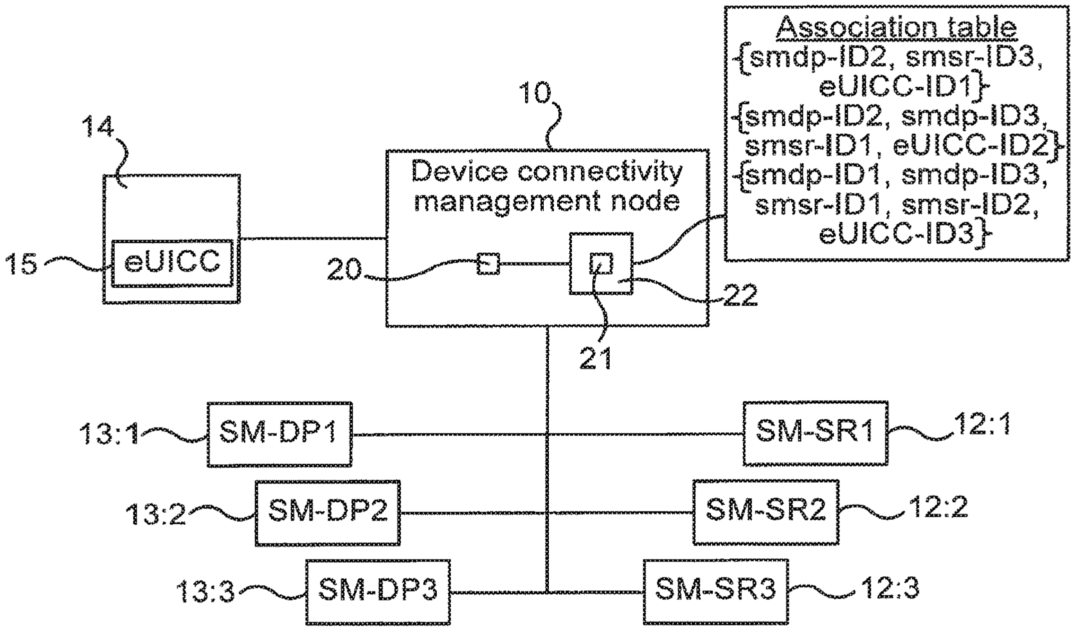
FIG. 1 illustrates a node for managing connectivity of a device to a network, which device comprises an eUICC, according to an embodiment of the invention.

FIG. 1 illustrates a node for 10 managing connectivity of a device 14 to a network, which device comprises an eUICC 15 to be provisioned by the node 10 such that the device 14 may be connected to an appropriate network, according to an embodiment of the invention. FIG. 1 further illustrates a number of SM-DPs 13:1, 13:2, 13:3 and a number of SM-SRs 12:1, 12:2, 12:3 with which the eUICC 15 may be associated, and an association table stored at the node 10. It should be noted that the table 11 may be stored elsewhere, and even stored at different entities in a network. Further, a data item of the table 11 pertaining to a specific eUICC 15 may be stored on said specific eUICC 15 of the corresponding device 14.

The device connectivity management node 10 typically comprises a processing unit 20 embodied in the form of one or more microprocessors arranged to execute a computer program 21 downloaded to a suitable storage medium 22 associated with the microprocessor, such as a Random Access Memory (RAM), a Flash memory or a hard disk drive. The processing unit 20 is arranged to cause the node 10 to carry out a method according to an embodiment of the invention, as will be described subsequently, when the appropriate computer program 21 comprising computer-executable instructions is executed by the processing unit 20. The storage medium 22 may also be a computer program product comprising the computer program 21. Alternatively, the computer program 21 may be transferred to the storage medium 22 by means of a suitable computer program product, such as a Digital Versatile Disc (DVD) or a memory stick. As a further alternative, the computer program 21 may be downloaded to the storage medium 22 over a network. The processing unit 20 may alternatively be embodied in the form of a digital signal processor (DSP), an application specific integrated circuit (ASIC), a field-programmable gate array (FPGA), a complex programmable logic device (CPLD), etc.

Now, for a particular eUICC implemented in a device, the device connectivity management node 10 will create an association and store the association in the table 11.

To exemplify, for a first eUICC implemented in a first cellular device identified by means of eUICC-ID1, respective identities of an SM-DP entity and an SM-SR entity with which the first cellular device is to connect are acquired. In this particular example, the first cellular device is to connect to SM-DP2 and SM-SR3, and correspondingly the first item in the association table 11 stores {smdp-ID2, smsr-ID3, eUICC-ID1}.

Further, in a second example, for a second eUICC implemented in a second cellular device identified by means Of eUICC-ID2, identities of two SM-DP entities and an SM-SR entity with which the second cellular device is to connect are acquired. In this second example, the second cellular device is to connect to SM-DP2, SM-DP3 and SM-SR1, and correspondingly the second item in the association table 11 stores {smdp-ID2, smdp-ID3, smsr-ID1, eUICC-ID2}.

Finally, in a third example, for a third eUICC implemented in a third cellular device identified by means of eUICC-ID3, identities of two SM-DP entities and two SM-SR entities with which the third cellular device is to connect are acquired. In this third example, the third cellular device is to connect to SM-DP1, SM-DP3, SM-SR1, SM-SR2, and correspondingly the third item in the association table 11 stores {smdp-ID1, smdp-ID3, smsr-ID1, smsr-ID2, eUICC-ID3}.

Hence, rather than statically associating eUICCs with one or more SM-DPs and/or SM-SRs, associations are created by the device connectivity management node 10 which subsequently can be changed if an eUICC is to be connected to another SM-DP/SM-SR in the network.

For instance, assuming that the third cellular device is to be connected to SM-SR3 instead of SM-SR2; the device connectivity management node 10 thus changes the third item in the association table 11 to contain the data {smdp-ID1, smdp-ID3, smsr-ID1, smsr-ID3, eUICC-ID3}, which advantageously facilitates a great measure of flexibility for connectivity management.

In an embodiment, the identities of the SM-DP and SM-SR entities are routable, i.e., they may for instance be provided in the form of an Internet Protocol (IP) address and optionally a port number.

In practice, the device connectivity management node 10 may, e.g., be operated by an MNO to which a customer of a particular cellular device subscribes. The eUICC-ID of the eUICC accommodated in the cellular device, and the smsr-ID of the SM-SR entity to which the cellular device is to be connected, are known by the MNO.

The smdp-ID is typically acquired by the node 10 by completing a subscription profile ordering procedure with a selected SM-DP to which the cellular device is to connect.

Figure 2:
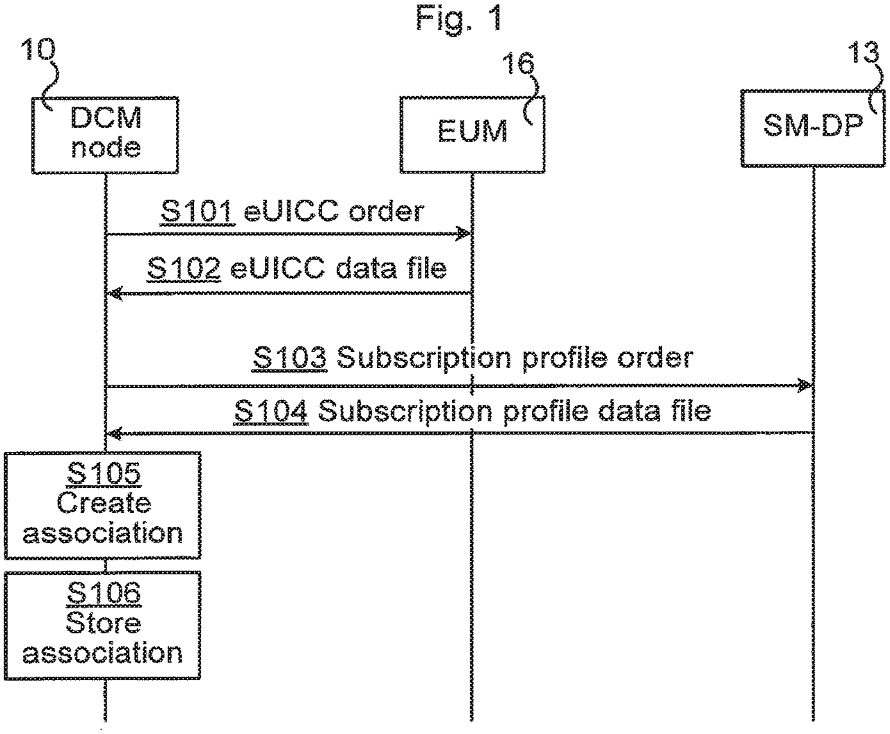
FIG. 2 shows a flowchart illustrating a method of managing connectivity of a device to a network, which device comprises an eUICC, according to an embodiment of the invention.

FIG. 2 shows a flowchart illustrating a method performed by the device connectivity management node 10 configured to manage connectivity to a network of a cellular device 14 comprising an eUICC 15. In a first step S101, the device connectivity management node 10 orders an eUICC with an EUM 16 or SM-DP actor 13, and thus acquires one or more smsr-IDs contained in the eUICC data file returned in step S102.

Thereafter, in step S103, the node 10 submits a subscription profile order to an SM-DP entity 13. The SM-DP entity 13 returns a subscription profile data file from which one or more smdp-IDs are acquired in step S104.

In step S105, the device connectivity management node id creates an association between the smsr-ID(s), the smdp-ID(s) and the eUICC-ID, and stores the created association in step S106, wherein the stored association subsequently can be changed for the eUICC by changing at least one of the smsr-ID(s) and smdp-ID(s) of the association.

Figure 3:
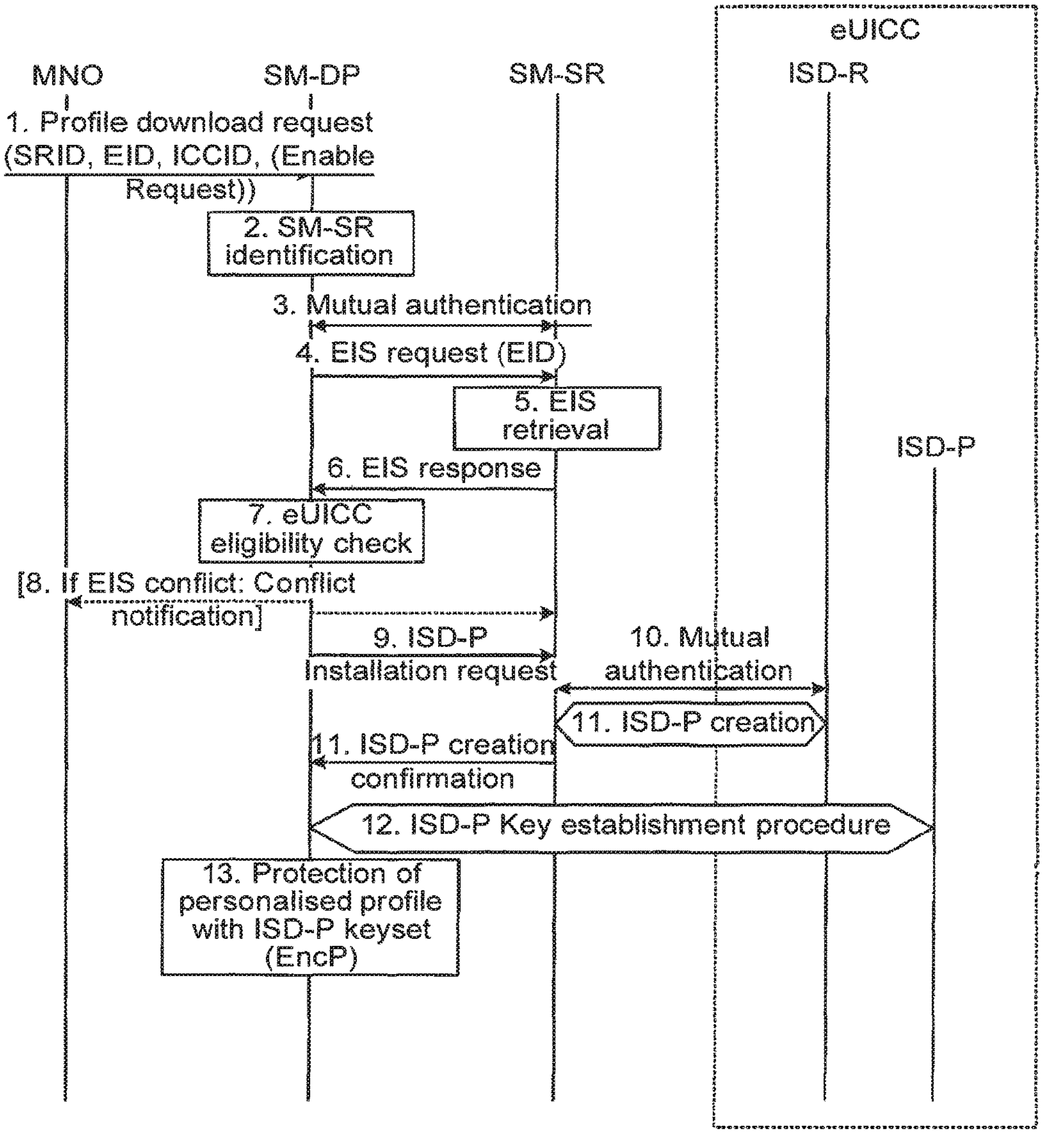
FIG. 3 shows a sequence diagram illustrating downloading of subscriptions profiles to an eUICC.
Figure 3:
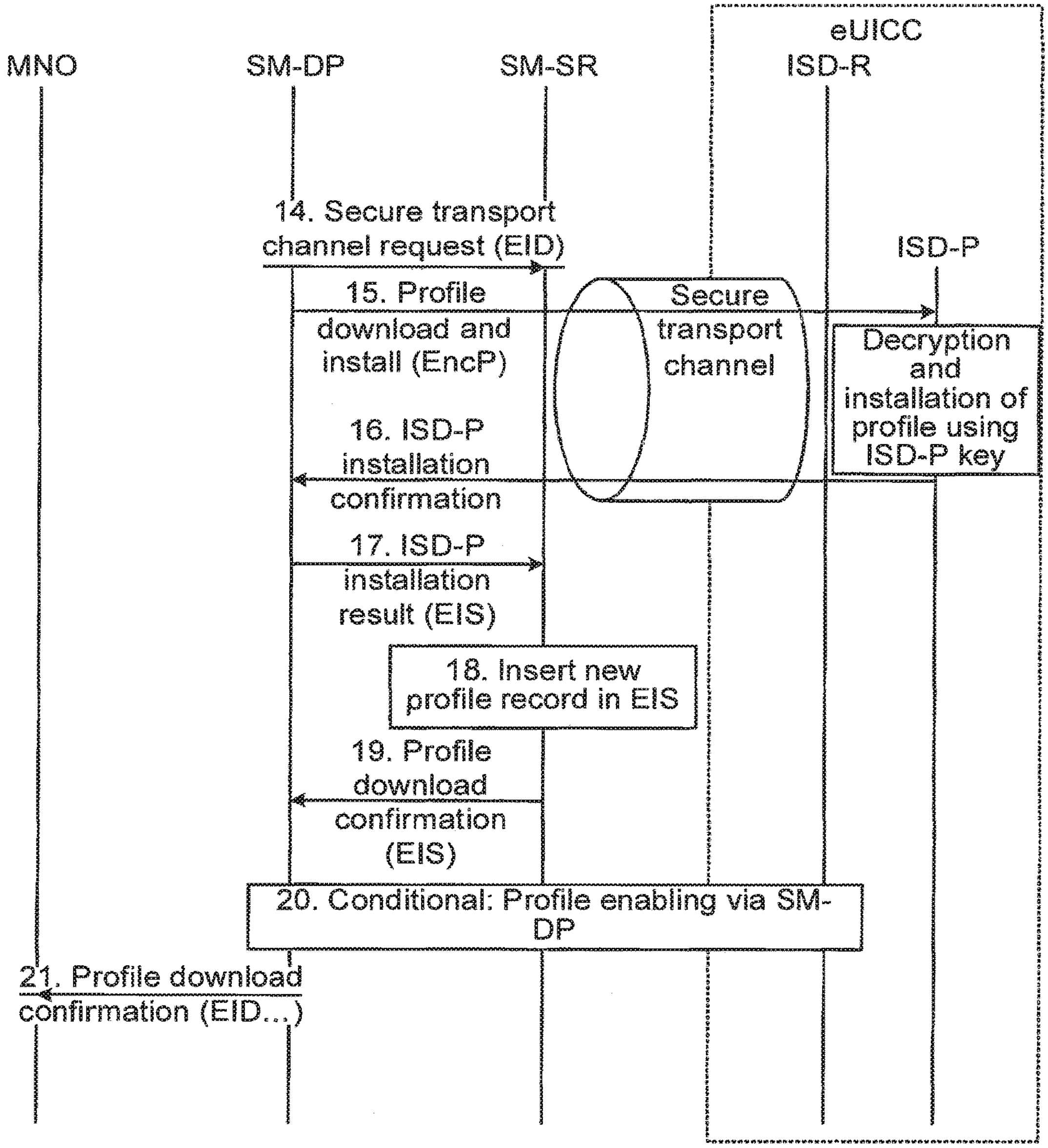
Figure 4:
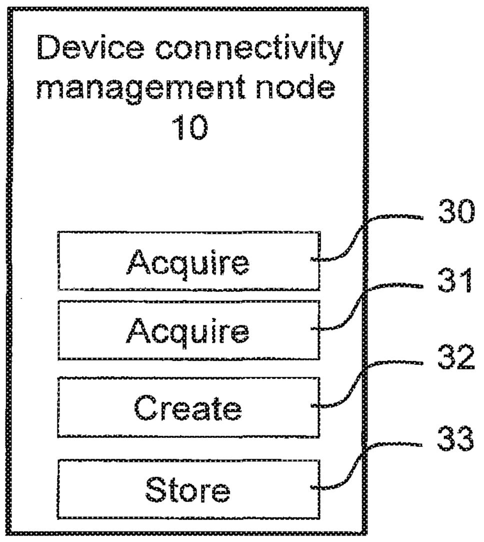
FIG. 4 illustrates a node for managing connectivity of a device to a network, which device comprises an eUICC, according to another embodiment of the invention.

FIG. 3 shows a sequence diagram illustrating in detail the downloading of subscriptions profiles to an eUICC.

The eUICC architecture comprises several security domains for the purpose of platform and profile management, as described for instance in GSMA Remote Provisioning Architecture for Embedded UICC, Technical Specification, Version 1.0, 17 Dec. 2013.

- The ISD-R is the representative of the off-card entity SM-SR. There shall be only one ISD-R on an eUICC. The ISD-R shall be installed and first personalized by the EUM during eUICC manufacturing.
- An ISD-P is the representative of an off-card entity SM-DP. An eUICC can contain more than one ISD-P. An ISD-P hosts a unique Profile. Only one ISD-P shall be enabled on an eUICC at any point in time. An ISD-P shall be installed by the ISD-R and then personalized by its related SM-DP. At least one ISD-P with a Profile shall be installed and first personalized by the EUM during eUICC manufacturing to allow future eUICC connectivity.

Before a subscription profile is downloaded, the following start conditions are required:

a. A customer has subscribed to a selected MNO.

b. The eUICC-ID of the target eUICC and the smsr-ID are known by the MNO.

c. A subscription profile ordering procedure has been completed with a selected SM-DP.

d. The target eUICC is integrated into a mobile terminal, such as an M2M device, and is associated with SM-SR.

e. Optionally, the MNO may activate the related subscription in the network using the Integrated Circuit Card Identifier (ICCID) associated with the eUICC.

Then, the following procedure is performed:

1. The MNO sends a "Profile Download request" to the SM-DP. In the proposed solution either the MNO, or the MNO on behalf of its Enterprise customer, has during time at subscription profile ordering, prior this step see further below, got hold of the SM-DP address for the referred eUICC. Optionally, the SM-SR address is also given at same subscription profile ordering or preferable during eUICC ordering process. Note that the subscription profile ordering process follows after the eUICC ordering process. The request includes the relevant information to allow the identification of the SM-SR, the target eUICC-ID, and the ICCID. Optionally, the MNO may also request the SM-DP to enable the profile once it is downloaded and installed.

2. Based on the information provided by the MNO, the SM-DP identifies the SM-SR with which the eUICC is currently registered.

3. The SM-SR and the SM-DP authenticate each other, if not already authenticated.

4. The SM-DP requests from the SM-SR the eUICC Information Set (EIS) for a particular eUICC, identified by its eUICC-ID.

5. Based on the eUICC-ID, the SM-SR retrieves the EIS.

6. The SM-SR sends the relevant information from the EIS to the requesting SM-DP. Note that the rationale for saying "relevant information from the EIS" is that the SM-SR preferably does not provide information to the SM-DP that is not appropriate for the particular SM-DP.

7. The SM-DP checks the eligibility of the eUICC, e.g., type, certificate and memory, based upon the received information from the EIS.

8. If a problem is detected with the eligibility of the eUICC, the SM-DP aborts the procedure and returns an error message to the requesting MNO and the SM-SR.

9. If no problem is detected with the eligibility of the eUICC, the SM-DP issues an installation request for the Issuer Security Domain Profile (ISD-P) to the SM-SR.

10. The SM-SR and the eUICC, using the key set in the Issuer Security Domain Root (ISD-R), authenticate each other, if not already authenticated.

11. The SM-SR contacts the ISD-Ron the eUICC for ISD-P installation and an empty ISD-P is created in the eUICC. This is confirmed back to the SM-DP.

12. The SM-DP authenticates the eUICC and a shared key set is established between the ISD-P and the SM-DP.

13. Now the SM-DP selects the Personalized Profile (e.g., based on the ICCID or Profile type) and protects it using the new ISD-P key set, yielding the encrypted and integrity protected profile EncP.

14. The SM-DP requests the SM-SR to establish a secure transport channel between the ISD-R on the eUICC and the SM-SR. This secure transport channel is for protection of profile management commands and not the profile itself.

The subscription order profile may, e.g., comprise the following field records:

| Field | Description | Example |
|---|---|---|
| Order ID | Service request identifier for the customer order.<br>15 alphanumeric value as follows:<br>Three letter prefix<br>12 digit service request ID | "REQ000000000345" |
| Batch ID | Order identifier for a batch of SIM.<br>15 alphanumeric value as follows:<br>Three letter prefix<br>12 digit interface order ID | "INT000000000168" |
| Customer Number | Company number assigned to the customer.<br>8 alphanumeric value. | "02000036" |
| Customer | Company name associated with the customer service request.<br>Alphanumeric value: Maximum 254 characters. | "ACME Corp" |
| IMSI | Start International Mobile Subscriber Identity (IMSI) number.<br>Alphanumeric value: 15 characters. | "901290010010001" |
| MSISDN | Start Mobile Station International Subscriber Directory Number (MSISDN) number.<br>Alphanumeric value: 15 characters (country code prefix + is not included). | "883120010010001" |
| SIM Spec Ref | ID of the SIM specification (SIM profile).<br>Alphanumeric value: Maximum 30 characters. | "31" |
| Quantity | Integer value that identifies the total number of SIM subscriptions ordered. | 5000 |
| Required Date | Date and time for when the service request is to be fulfilled.<br>Value format: YYYY/MM/DD. | "2009/09/06" |
| Delivery Address | Full delivery address.<br>Alphanumeric value: Maximum 255 characters.<br>Semi colon (;) is used to separate the fields in the address. Comma (,) is permitted within the value, but not adjacent to a quotation mark ("). | "ACME Corp; Street 1; Street 2; City; Province Postcode Country" |
| Shipment Type | Shipment type.<br>Alphanumeric value: Maximum 30 characters.<br>In this release, this value is set to "NULL". | "NULL" |
| Package Marking | Any special marking for the delivery.<br>Alphanumeric value: Maximum 80 characters. | "ABC" |

In response to receiving a subscription profile order, the SM-DP transmits a data file to the device connectivity management node 10. The data file may, e.g., comprise the following field records:

| Field | Description | Example |
|---|---|---|
| Order ID | Same as above. | Same as above. |
| Batch ID | Same as above. | Same as above. |
| IMSI | Allocated IMSI number for the SIM.<br>Numeric value: Maximum 15 digits. | "901290010010001" |
| MSISDN | Allocated MSISDN number for the SIM.<br>Numeric value: Maximum 15 digits. | "883120010010001" |

-continued

| Field | Description | Example |
|---|---|---|
| ICCID | Allocated Integrated Circuit Card ID (ICCID) for the SIM. This is also known as SIM Identification. Numeric value: Maximum 20 digits. | "89833120000100100010" |
| KI | Encrypted KI authentication key. Alphanumeric value: Maximum 32 characters. | "214689214ae2b3" |
| PIN1 | First Personal Identification Number (PIN) code. Numeric value: Maximum four digits. | "1234" |
| PUK1 | First PIN Unlock Key (PUK) code. Numeric value: Maximum eight digits. | "12345678" |
| PIN2 | Second PIN code. Numeric value: Maximum four digits. | "4321" |
| PUK2 | Second PUK code. Numeric value: Maximum eight digits. | "87654321" |
| ACC | Access Control Class (ACC). Alphanumeric value: Maximum 4 characters. | "01AB" |
| Key Index | Unique index of the operator key and transport key. Alphanumeric value: Maximum 15 characters. Note: The Key Index mentioned in each record must match the Key Index configured in DCP (for the operator). If it does not match, the import fails. | "ABC001" |
| smsr-ID | Routable SM-SR identity For example, an IP address and optionally a port number. | "123.123.123.123/100" |
| smdp-ID | Routable SM-DP identity For example, an IP address and optionally a port number. | "123.123.123.123/200" |

Alternatively, rather than transmitting the smsr-ID in the data file which is returned in response to ordering a subscription profile, the smsr-ID may also be transmitted in the data file which is transmitted in response to an eUICC order.

That is, to enable multiple SM-DPs in accordance with embodiments of the invention, the data file includes a routable SM-DP identity.

As a consequence of the described ordering processes, eUICC ordering and subscription profile ordering, the device connectivity management node 10 acquires information about the SM-SR and the SM-DP which are currently active for a specific eUICC-ID.

Note that, for the above example of a subscription profile order and corresponding data file, the device connectivity management node 10 can derive the eUICC-ID which is associated with the received smdp-ID based on, e.g., the IMSI or MSISDN, which are contained in both the subscription profile order and the received data file. The smsr-ID has already been associated with the eUICC-ID in the eUICC ordering process.

The solution described herein enables integrating any GSMA compliant and accredited SM-SR actor or SM-DP actor into established OTA subscription management processes. It further allows changing from existing SM-SR and SM-DP actors to new SM-SR and SM-DP actors.

It will be understood that the nodes described herein (e.g., mobile terminal, SM-SR, SM-DP and the like) can be implemented by a data processing system that includes at least one processor, memory, and a network-interface coupled by an interconnect. The memory can be implemented by a hard disk drive, flash memory, RAM, ROM, or any other type of non-transitory computer-readable storage medium. The non-transitory computer-readable storage medium further includes computer-readable instructions, when executed by the at least one processor, implements the functionality described above. The computer-readable instructions can also be embodied in a transitory computer-readable medium such as a signal or carrier wave. The network interface enables the node to communicate with other nodes within the network. Alternative embodiments of the present invention may include additional components responsible for providing additional functionality, including any functionality described above and/or any functionality necessary to support the solution described above.

FIG. 6 illustrates a node 10 for managing connectivity of a device comprising an eUICC according to a further embodiment. The device connectivity management node 10 comprises acquiring means 30 adapted to acquire an identity of at least one SM-SR entity, acquiring means 31 adapted to acquire an identity of at least one SM-DP entity, and creating means 32 adapted to create an association between the identity of the at least one SM-DP entity, the identity of the at least one SM-SR entity and an identity of the eUICC. Further, the node 10 comprises storing means 33 adapted to store the created association, wherein the stored association subsequently can be changed for the eUICC by changing at least one of the identity of the at least one SM-DP entity and the identity of the at least one SM-SR entity with which the eUICC is to be associated.

The means 30-33 may comprise a communications interface for receiving and providing information, and further a local storage for storing data, and may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive.

The disclosure has mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method performed by a node for managing connectivity of a device comprising an embedded Universal Integrated Circuit Card, eUICC, the node being configured to provision the eUICC for network connectivity of the device, comprising:

acquiring at the node an identity of at least one Subscription Manager-Secure Router, SM-SR, entity that is separate from the node;

acquiring at the node an identity of at least one Subscription Manager-Data Preparation, SM-DP, entity that is separate from the node;

creating an association between the identity of the at least one SM-DP entity, the identity of the at least one SM-SR entity and an identity of the eUICC; and storing the created association, wherein the stored association subsequently can be changed for the eUICC by replacing at least one of the identity of the at least one SM-DP entity and the identity of the at least one SM-SR entity with which the eUICC is to be associated.

2. The method of claim 1, wherein the creating of the association comprises:

creating an association between the identities of a plurality of SM-DP entities, the identity of the at least one SM-SR entity and the identity of the eUICC.

3. The method of claim 1, wherein the creating of the association comprises:

creating an association between the identity of the at least one SM-DP entity, the identities of a plurality of SM-SR entities and the identity of the eUICC, wherein the plurality of SM-SR entities comprise a first SM-SR entity and a second SM-SR entity, different from the first SM-SR entity.

4. The method of claim 1, the eUICC comprising a plurality of subscription profiles, wherein the creating of the association comprises:

creating an association between the identities of a plurality of SM-DP entities, the identity of a single SM-SR entity and the identity of the eUICC, where the identity of each of the plurality of SM-DP entities is associated with a corresponding subscription profile among the plurality of subscription profiles.

5. The method of claim 1, wherein the acquiring of an identity of at least one SM-SR entity comprises:

requesting the identity of the at least one SM-SR entity, the at least one SM-SR identity being provided in an eUICC data file.

6. The method of claim 5, the entity to which the request is made being an Embedded UICC Manufacturer, EUM, of the eUICC or an SM-SR entity for which the identity is requested.

7. The method of claim 1, wherein the acquiring of an identity of at least one SM-DP entity comprises:

requesting the identity of the at least one SM-DP entity, the at least one SM-DP entity being provided in a subscription profile data file.

8. The method of claim 7, the entity to which the request is made being an SM-DP entity for which the identity is requested.

9. The method according to claim 1, the identities being configured to designate a destination address of the respective SM-SR and SM-DP entities.

10. The method according to claim 9, the destination address being an Internet Protocol, IP, address.

11. A computer program product comprising a non-transitory computer readable storage medium storing computer-executable instructions for causing a node to perform steps recited in claim 1 when the computer-executable instructions are executed on a processor comprised in the node.

12. A node configured to manage connectivity of a device comprising an embedded Universal Integrated Circuit Card, eUICC, the node being configured to provision the eUICC for managing the network connectivity of the device, which node comprises a processing unit and a memory, said memory containing instructions executable by said processing unit, whereby said node is configured to:

acquire at the node an identity of at least one Subscription Manager-Secure Router, SM-SR, entity that is separate from the node;

acquire at the node an identity of at least one Subscription Manager-Data Preparation, SM-DP, entity that is separate from the node;

create an association between the identity of the at least one SM-DP entity, the identity of the at least one SM-SR entity and an identity of the eUICC; and store the created association, wherein the stored association subsequently can be changed for the eUICC by replacing at least one of the identity of the at least one SM-DP entity and the identity of the at least one SM-SR entity with which the eUICC is to be associated.

13. The node of claim 12, further configured to, when creating the association:

create an association between the identities of a plurality of SM-DP entities, the identity of the at least one SM-SR entity and the identity of the eUICC.

14. The node of claim 12, further being configured to, when creating the association:

create an association between the identity of the at least one SM-DP entity, the identities of a plurality of SM-SR entities and the identity of the eUICC, wherein the plurality of SM-SR entities comprise a first SM-SR entity and a second SM-SR entity, different from the first SM-SR entity.

15. The node of claim 12, the eUICC comprising a plurality of subscription profiles, and the node further configured to, when creating the association:

create an association between the identities of a plurality of SM-DP entities, the identity of a single SM-SR entity and the identity of the eUICC, where the identity of each of the plurality of SM-DP entities is associated with a corresponding subscription profile among the plurality of subscription profiles.

16. The node of claim 12, further configured to, when acquiring an identity of at least one SM-SR entity:

request the identity of the at least one SM-SR entity, the identity being provided in an eUICC data file.

17. The node of claim 16, further configured to make the request to an Embedded UICC Manufacturer, EUM, of the eUICC or an SM-SR entity for which the identity is requested.

18. The node of claim 12, further configured to, when acquiring an identity of at least one SM-DP entity:

request the identity of the at least one SM-DP entity, the at least one SM-DP identity being provided in a subscription profile data file.

19. The node of claim 18, further configured to make the request to an SM-DP entity for which the identity is requested.

20. The node of claim 12, wherein the identities are configured to designate a destination address of the respective SM-SR and SM-DP entities.

21. The node according to claim 20, wherein the destination address is an Internet Protocol, IP, address.

22. The node of claim 12, further configured to store the created association in a memory of the node and/or on the eUICC of the device.

* * * * *